Jan. 22, 1929.

P. L. MARDIS 1,699,797

CONTROL SYSTEM

Filed Oct. 5, 1926

WITNESSES:
C. J. Weller.
E. W. Savage.

INVENTOR
Paul L. Mardis.
BY
Wesley G. Carr
ATTORNEY

Patented Jan. 22, 1929.

1,699,797

UNITED STATES PATENT OFFICE.

PAUL L. MARDIS, OF EDGEWOOD, PENNSYLVANIA, ASSIGNOR TO WESTINGHOUSE ELECTRIC & MANUFACTURING COMPANY, A CORPORATION OF PENNSYLVANIA.

CONTROL SYSTEM.

Application filed October 5, 1926. Serial No. 139,645.

My invention relates generally to motor-control systems and more particularly to motor-control systems adapted for operating a plurality of motors in series and in parallel relation.

The object of the invention, generally stated, is the provision of a motor-control system that shall be simple and efficient in operation and that may be readily and economically manufactured and installed.

A more specific object of the invention is to provide for limiting the movement of a controller, disposed to be utilized to connect a plurality of motors for series and parallel operation, when one of the motors has been excluded from the circuit.

Another object of the invention is to provide for the interruption of predetermined circuits when one of a plurality of motors, disposed to operate in parallel relation, has been cut out by the operator, thereby necessitating the manual actuation of a switch, which serves to restrict the movements of the controller when it is set in position to permit the closure of the motor circuits.

Other objects of the invention will, in part, be obvious and will, in part, appear hereinafter.

The invention, accordingly, is disclosed in the embodiment thereof shown in the accompanying drawing and comprises the structural features, the combination of elements and the arrangement of parts that will be exemplified in the structure hereinafter set forth and the scope of the application of which will be indicated in the claims.

Figure 1:
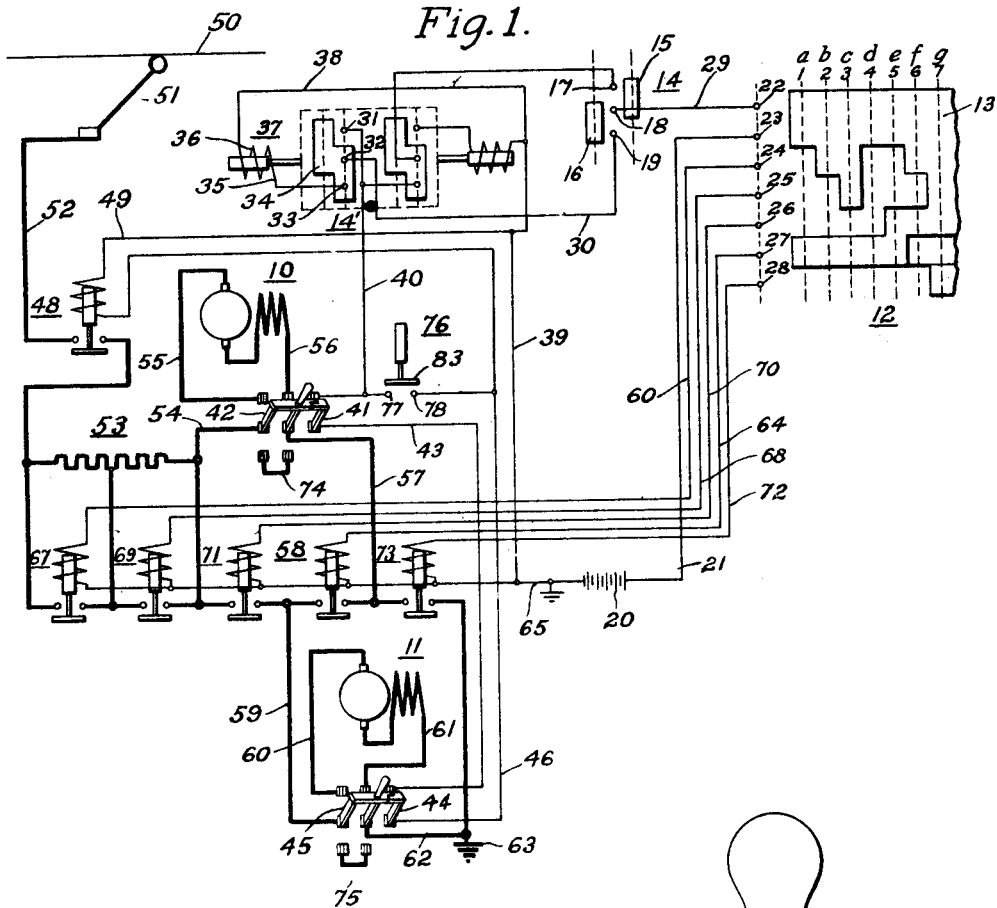
Figure 2:
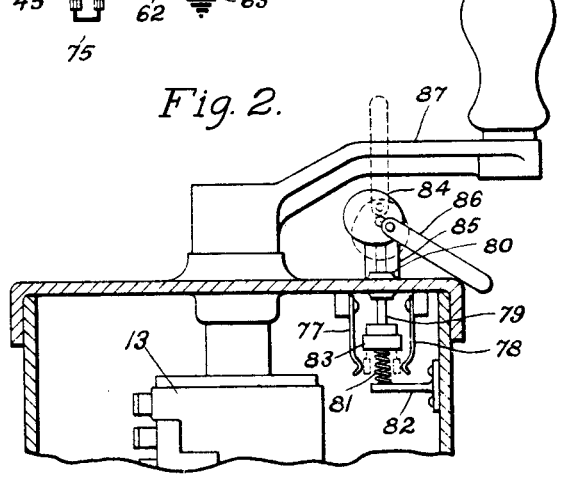

For a fuller understanding of the nature and objects of the invention, reference should be had to the following detailed description, taken in connection with the accompanying drawing, in which;

Fig. 1 is a diagrammatic view of a motor-control system embodying my invention; and Fig. 2 is a view, in side elevation, of a switch, shown as mounted on a controller.

In order that the invention may be readily understood, a motor circuit, to which it may be applied, will be described. The motor circuit selected, and diagrammatically shown in the drawing, is a simple one for operating two motors in series and in parallel relation. However, it is to be understood that the present device may be used with any motor circuit where it is desired to prevent the establishment of parallel-circuit connections when one or more motors has or have been excluded from the circuit.

Referring now to the drawing, two motors 10 and 11, of the series, commutator type, are disposed to be connected for operation in series or parallel relation. The closure of the necessary circuits for connecting the motors in the desired relations may be effected by means of a master controller shown generally at 12.

The type of controller utilized will depend on the operating conditions and, in this particular case, a manually operable controller, such as shown in Fig. 2, is utilized. As will be observed, the drum of the controller carries a contact segment 13, a development of which is illustrated in Fig. 1.

In order to control the direction of rotation of the motors, a master reversing switch, shown diagrammatically at 14, is provided. In this construction, the master reversing switch is provided with two contact segments 15 and 16, disposed to engage a plurality of contact fingers 17 to 19, inclusive.

Associated with the master reversing switch 14 is an electromagnetically actuated drum, which may constitute part of a main reversing switch, a development of which is illustrated at 14'. The circuits are arranged, as will be described hereinafter, to cooperate with the switch 14 when thrown to its forward or to its reverse position to set the drum 14' in a corresponding position.

In setting the motors in operation in the forward direction, the master reversing switch 14 is thrown to its forward position, projecting the contact segment 16 into engagement with the contact fingers 18 and 19. Then, upon the actuation of the master controller 12 to its position "a", a circuit is established from a battery 20, through conductor 21, contact fingers 22 and 23, bridged by the contact segment 13, conductor 29, contact fingers 18 and 19, bridged by the contact segment 16, conductor 30, contact fingers 32 and 33, bridged by the contact segment 34 of drum 14', conductor 35, the actuating coil 36 of electromagnet 37, and conductor 38 to the battery through conductor 39. Upon the energization of the electromagnet 37, the contact segment 34 is projected to the right, causing it to bridge the contact fingers 31 and 32.

When the drum 14′ is set in its "forward" position, a circuit is established from the energized conductor 30, through contact fingers 32 and 31, bridged by the contact segment 34, conductor 40, an auxiliary blade 41 of a double-throw switch 42, conductor 43, an auxiliary blade 44 of a double-throw switch 45, conductor 46, the actuating coil of the switch 48, and conductors 49 and 39, to the battery 20. In this manner, the switch 48, which may be referred to as the line switch, is closed.

Simultaneously with the establishment of the line-switch-actuating circuit, another circuit, which functions to operate the series switch 58, is closed. As will be observed, when the controller is set in position "a", the contact segment 13 engages a contact finger 27. Current thereupon flows from the battery 20, through conductor 21, contact fingers 23 and 27, bridged by the contact segment 13, conductor 64, the actuating coil of switch 58, and conductor 65 to the battery.

Consequently, a motor circuit is established from the trolley conductor 50, through the trolley pole 51, conductor 52, switch 48, resistor 53, conductor 54, one blade of double-throw switch 42, conductor 55, motor 10, conductor 56, another blade of the double-throw switch 42, conductor 57, switch 58, conductor 59, one blade of the double-throw switch 45, conductor 60, motor 11, conductor 61, a second blade of the double-throw switch 45, and conductor 62 to the ground at 63. The motors are now connected in series relation and start to rotate.

As the controller 12 is moved forward through positions "b" and "c", contact fingers 24 and 25 are engaged successively by the contact segment 13, whereby conductors 60 and 68 are successively connected to the energized conductor 21, and two switch-actuating circuits are closed. The first of these circuits extends from the contact finger 24, through conductor 26, the actuating coil of switch 67, and conductor 65 to the battery. The second switch-actuating circuit extends from contact finger 25, through conductor 68, the actuating coil of switch 69 and conductor 65 to the battery. Therefore, switches 67 and 69 are closed successively, and the two sections of the resistor 53 are excluded from the motor circuit.

After the controller 12 is moved from position "c" to position "d", the transition from series connections to parallel connections is begun. The conductors 60 and 68 are de-energized and the switches 67 and 69 are dropped out, thereby again inserting the resistor 53 in the motor circuit. Further rotation of the controller 12 sets up the circuits required for connecting the motors for parallel operation.

It will be observed that, when the controller reaches position "e", the contact finger 26 is engaged by the contact segment 13, and a circuit is established from the battery 20 through conductor 21, contact fingers 23 and 26, bridged by the contact segment 13, conductor 70, the actuating coil of switch 71 and conductor 65 to the battery. The next position, "f", of the controller effects the disengagement of the finger 27 from the contact segment 13, and, therefore, the deenergization of the actuating coil of switch 58.

The next step in the transition is the energization of the actuating coil of switch 73. As will be noted, when the controller is set in position "g", the contact segment 13 engages the contact finger 28, and current flows from the battery 20 through conductor 21, contact fingers 23 and 28, bridged by the contact segment 13, conductor 72, the actuating coil of switch 73, and conductor 65 to the battery.

Assume now that a short-circuit occurs in motor 10 and that it is necessary to exclude the motor from the circuit. In order to isolate the motor 10, the double-throw switch 42 is manually operated to cut-out or by-pass the motor through conductor 74. As will be readily seen, unless the main-motor circuit is interrupted, a circuit from trolley to ground will be established by the operation of the manual switch 42. This circuit would extend from the trolley 50 through trolley pole 51, conductor 52, switch 48, switches 67 and 69, conductor 54, switch 42, conductor 74, conductor 57, and switch 73 to the ground at 63.

With a view to preventing the establishment of such a circuit, provision is made for interrupting the actuating circuit of the line switch 48. As shown in the figure, the manually operable switches 42 and 45, provided for cutting-out the motors 10 and 11, respectively, are adapted to interlock with and operate auxiliary blades 41 and 44, when thrown in one direction; that is when thrown to the illustrated lower or "cut-out" position. In this embodiment of the invention, therefore, the auxiliary blades 41 and 44 of switches 42 and 45, respectively, are so disposed that they are not thrown to their closed positions when the switches 42 and 45 are moved to their upper positions.

Reference to the actuating circuit of switch 48, which has been traced in a preceding part of this specification, will reveal that the auxiliary blades 41 and 44 are connected in that circuit. Consequently, when either of the switches 42 or 45 is actuated to cut-out a motor, the line switch 48 is opened by the operation of the auxiliary blade 41 or blade 44 and cannot again be established until all the motors are again connected in the circuit.

A conductor 75 is provided for establishing connection between the blades of the double-throw switch 45, in its lower position, to co-operate in the cutting-out of motor 11. As will be readily understood, this conductor functions merely as a bridge.

In order to provide for the operation of the motor 11, independently of motor 10, provision is made for establishing a second actuating circuit for the switch 48. In this particular construction, a manually operable switch 76, disposed to engage contact fingers 77 and 78, is provided for closing the second circuit that maybe utilized for closing the switch 48.

The construction of the switch 76 is best shown in Fig. 2. It comprises a plunger 79, slidably mounted in an insulating bushing 80, disposed in the top of the casing of the controller 12. In order to maintain the plunger in its raised position, out of engagement with the contact fingers 77 and 78, a spring 81, supported on a bracket 82, which is made of some insulating material, is provided.

The contact fingers 77 and 78 are suspended from the top of the casing of the controller and disposed to engage a bridging member 83 carried by the plunger. In order to actuate the plunger to its lower position to project the bridging member 83 into engagement with the contact fingers 77 and 78, a cam 84 is rotatably mounted between brackets 85, carried by the controller. As shown, this cam rides on the upper end of the plunger 79 and is provided with a handle 86 by means of which it may be actuated.

The handle 86 is made of sufficient length to extend into the path of the actuating handle 87 of the controller (as indicated in dotted lines) to thereby restrict the movement of the latter when the switch 76 is closed. It will be readily understood that the switch 76 may be set in any predetermined position on the controller to limit the angular movement of the controller handle 87 to the desired degree.

Assume now that the switch 76 is closed to establish an actuating circuit for the switch 48. When the controller 12 is set in position "a", current will flow from the battery 20, through conductor 21, contact fingers 22 and 23, bridged by the contact segment 13, conductor 29, contact fingers 18 and 19, bridged by the contact segment 16 of the master reversing switch 14, conductor 30, contact fingers 32 and 31, bridged by the contact segment 34 of the drum 14', conductor 40, contact fingers 77 and 78, connected by the bridge 83, conductor 46, actuating coil of the switch 48, and conductors 49 and 39 to the battery 20.

If no provision is made for limiting the movement of the drum 13 of the controller 12 when the line switch is closed by the actuation of switch 76, the previously traced short-circuit between the trolley 50 and the ground at 63 could be established, by moving the controller forward to position "g", where the circuits for parallel operation of the motors are established. However, as already described, when the switch 76 is closed, the handle 86 is set in a position to restrict the movement of the drum 13 of the controller.

Therefore, by providing means for cutting out one motor and means for limiting the movement of the controller 12, one motor may be operated individually without danger of establishing short-circuits which might prove dangerous to the apparatus.

Since certain changes may be made in the above construction, and different embodiments of the invention may be made without departing from the scope thereof, it is intended that all matter contained in the above description, or shown in the accompanying drawing, shall be interpreted as illustrative and not in a limiting sense.

I claim as my invention:

1. In a control system for a plurality of motors provided with circuits for connecting them in different operating relations, in combination, means for controlling the motor circuits, a switch for interrupting the motor circuits, an actuating circuit for the switch means for by-passing a motor, means disposed for operation by the by-passing means for opening the switch-actuating circuit, and manually controlled means for closing the switch-actuating circuit independently of the by-passing means, said manually controlled means being disposed to limit the operation of said means provided for controlling the motor circuits.

2. In a control system for a plurality of motors provided with circuits for connecting them in different operating relations across a source of supply, in combination, a controller for establishing the circuit connections, a switch for interrupting the circuit between the motors and the source of supply, means for by-passing a motor, means for actuating said switch to open the motor circuits when a motor is by-passed, and means for actuating the switch independently of the by-passing means, said last-named switch-actuating means being disposed to restrict the operation of the controller when operated to set the switch in its closed position.

3. In a control system for a plurality of motors provided with circuits for connecting them in different operating relations across a source of supply, in combination, a controller for establishing the circuit connections, a switch for interrupting the circuit between the motors and the source of supply, a plurality of actuating circuits for the switch, means for by-passing the motors, means actuated by the by-passing means for breaking one of the switch-actuating circuits, and means independent of the by-passing means, for closing another switch-actuating circuit, to permit the operation of the motors, said independent means being disposed to limit the movement of the controller.

4. In a control system for a plurality of motors provided with circuits for connecting them in different operating relations across a source of supply, in combination, a controller for establishing the circuit connections, a switch for interrupting the circuit between the motors and the source of supply, a plurality of actuating circuits for the switch, means for by-passing the motor, means actuated by the by-passing means for breaking one of the switch-actuating circuits, and manually controlled means for establishing another switch-actuating circuit to permit the operation of the motors, said manually controlled means being adapted to control the movement of the controller.

5. In a control system, in combination, a power source, a plurality of motors disposed to be operated from the power source, a controller for connecting the motors to the power source in different operating relations, a switch connected between the motors and power source, and means for actuating said switch, disposed to limit the operation of the controller when operated to close the switch.

6. In a control system for a plurality of motors provided with circuits for connecting them in different operating relations across a power source, in combination, a controller for establishing the circuit connections, a switch connected between the motors and the power source, a plurality of actuating circuits for said switch, manually operable means for by-passing one of the motors, means actuated by the by-passing means for interrupting one of the switch-actuating circuits thereby to disconnect the motors from the power source, means for closing another switch-actuating circuit to permit the connection of a motor to said source, said means for closing the switch-actuating circuit being disposed to limit the movements of the controller, thereby to prevent the actuation of the controller to establish parallel connections when one of the motors is by-passed.

7. In a control system for a plurality of motors provided with circuits for connecting them in different operating relations across a power source, in combination, a controller for establishing the circuit connections, a switch connected between the motors and the power source, a plurality of actuating circuits for said switch, manually operable means for by-passing one of the motors, means actuated by the by-passing means for interrupting one of the switch-actuating circuits thereby to disconnect the motors from the power source, said manually operable by-passing means being adapted to maintain one of the switch-actuating circuits open, means for closing another switch-actuating circuit to permit the connection of a motor to said source, said means for closing the switch-actuating circuit being disposed to limit the movements of the controller, thereby to prevent the actuation of the controller to establish parallel connections when one of the motors is by-passed.

8. In a control system for a plurality of motors, in combination, means for by-passing a motor, a switch for controlling the supply of electrical energy to the motors, means disposed for actuation by the by-passing means adapted to open the switch, and means for closing the switch independently of the by-passing means.

9. In a control system for a plurality of motors, in combination, means for connecting the motors in different operating relations, means for by-passing one of the motors, a switch for controlling the supply of electrical energy to the motors, means disposed for operation by the by-passing means adapted to open the switch, and means for closing the switch independently of the means actuated by the by-passing means, said switch-closing means being disposed to limit the operation of the connecting means when actuated to close the switch.

In testimony whereof, I have hereunto subscribed my name this 29th day of September, 1926.

PAUL L. MARDIS.